(12) United States Patent
Meyers et al.

(10) Patent No.: US 10,811,646 B2
(45) Date of Patent: Oct. 20, 2020

(54) ELECTRIFIED VEHICLE WITH AUXILIARY BATTERY RACK HAVING COLLAPSIBLE FRAME AND CORRESPONDING METHOD

(71) Applicant: Ford Global Technologies, LLC, Dearborn, MI (US)

(72) Inventors: Charles Meyers, Westland, MI (US); Mark E. Krugman, Bloomfield Hills, MI (US); Niel August Lewis, Warwick, NY (US); Charles Westberg, Livonia, MI (US); Bradley Arnold Lammers, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 86 days.

(21) Appl. No.: 16/176,034

(22) Filed: Oct. 31, 2018

(65) Prior Publication Data

US 2020/0136107 A1   Apr. 30, 2020

(51) Int. Cl.
*B60K 1/04* (2019.01)
*H01M 2/10* (2006.01)
*H01M 2/20* (2006.01)
*B60L 50/64* (2019.01)
*B60L 50/60* (2019.01)

(52) U.S. Cl.
CPC ............. *H01M 2/1077* (2013.01); *B60K 1/04* (2013.01); *B60L 50/64* (2019.02); *B60L 50/66* (2019.02); *H01M 2/1083* (2013.01); *H01M 2/206* (2013.01); *H01M 2220/20* (2013.01)

(58) Field of Classification Search
CPC ............. H01M 2/1077; H01M 2/1083; H01M 2/1072; H01M 2/206; H01M 2/202; H01M 2220/20; B60L 50/64; B60L 50/66; B60L 50/50; B60K 1/04
USPC ...................................................... 180/68.5
See application file for complete search history.

(56) References Cited

U.S. PATENT DOCUMENTS

| | | | |
|---|---|---|---|
| 6,841,293 B1 | 1/2005 | Dreulle et al. | |
| 7,838,142 B2 | 11/2010 | Scheucher | |
| 7,948,207 B2* | 5/2011 | Scheucher | B60L 11/1861 320/104 |
| 8,889,283 B2 | 11/2014 | Marchio et al. | |
| 8,978,804 B2* | 3/2015 | Okada | H01M 2/1083 180/68.5 |
| 9,246,200 B2 | 1/2016 | Kang et al. | |
| 9,324,981 B2 | 4/2016 | Schmieder | |

(Continued)

OTHER PUBLICATIONS

Arora, Shashank, Ajay Kapoor, and Weixiang Shen, "Application of Robust Design Methodology to Battery Packs for Electric Vehicles: Identification of Critical Technical Requirements for Modular Architecture," Batteries 2018, MDPI, Basel, Switzerland, published Jul. 2, 2018.

*Primary Examiner* — John D Walters
(74) *Attorney, Agent, or Firm* — David B. Kelley; Carlson, Gaskey & Olds, P.C.

(57) ABSTRACT

This disclosure relates to an electrified vehicle with an auxiliary battery rack, which has a collapsible frame, and a corresponding method. In particular, the auxiliary battery rack is located at least partially within a storage compartment of the electrified vehicle. The auxiliary battery rack includes a frame configurable in a support position and a collapsed position in which the frame occupies less volume in the storage compartment than when in the support position.

18 Claims, 9 Drawing Sheets

(56) References Cited

U.S. PATENT DOCUMENTS

| | | |
|---|---|---|
| 9,755,212 B2 | 9/2017 | Kedir et al. |
| 2003/0175584 A1 | 9/2003 | Shrim et al. |
| 2015/0333303 A1 | 11/2015 | Hachiya et al. |
| 2016/0301109 A1 | 10/2016 | Peng et al. |

\* cited by examiner

ELECTRIFIED VEHICLE WITH AUXILIARY BATTERY RACK HAVING COLLAPSIBLE FRAME AND CORRESPONDING METHOD

TECHNICAL FIELD

This disclosure relates to an electrified vehicle with an auxiliary battery rack, which has a collapsible frame, and a corresponding method.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

SUMMARY

An electrified vehicle according to an exemplary aspect of the present disclosure includes, among other things, an auxiliary battery rack located at least partially within a storage compartment of the electrified vehicle. The auxiliary battery rack includes a frame configurable in a support position and a collapsed position in which the frame occupies less volume in the storage compartment than when in the support position.

In a further non-limiting embodiment of the foregoing electrified vehicle, the auxiliary battery rack is configured to support at least one auxiliary battery when the frame is in the support position.

In a further non-limiting embodiment of any of the foregoing electrified vehicles, the electrified vehicle includes a battery pack configured to supply electrical power to an electrical machine. The at least one auxiliary battery is electrically coupled to the battery pack via the auxiliary battery rack.

In a further non-limiting embodiment of any of the foregoing electrified vehicles, the electrified vehicle includes a DC-to-DC converter configured to increase the voltage provided by the at least one auxiliary battery and supply the increased voltage to the battery pack.

In a further non-limiting embodiment of any of the foregoing electrified vehicles, when the frame is in the support position, the frame provides a plurality of bays, each configured to receive an auxiliary battery.

In a further non-limiting embodiment of any of the foregoing electrified vehicles, the frame includes a first plate, a second plate arranged generally opposite the first plate, a plurality of columns extending between the first and second plates, and a backplate connected to the first and second plates and arranged generally opposite the plurality of columns. Further, each of the plurality of bays is provided between adjacent ones of the plurality columns and between the first and second plates.

In a further non-limiting embodiment of any of the foregoing electrified vehicles, at least one of the first plate and the second plate includes a plurality of channels, each of the channels faces a respective one of the plurality of bays, and each of the channels are configured to guide an auxiliary battery.

In a further non-limiting embodiment of any of the foregoing electrified vehicles, a width dimension of the channels tapers moving toward the backplate.

In a further non-limiting embodiment of any of the foregoing electrified vehicles, the backplate includes a plurality of sets of recesses configured to hold the first plate, each set of recesses spaced-apart from one another, and the first plate is received one of the sets of recesses to establish a distance between the first and second plates and a dimension of each of the bays.

In a further non-limiting embodiment of any of the foregoing electrified vehicles, the plurality of columns have a dimension corresponding to the distance between the first and second plates.

In a further non-limiting embodiment of any of the foregoing electrified vehicles, when the frame is in the collapsed position, the plurality of columns and the first plate lie in a common plane with the second plate.

In a further non-limiting embodiment of any of the foregoing electrified vehicles, when the frame is in the collapsed position, the first plate, the plurality of columns, and the second plate are stacked upon one another.

In a further non-limiting embodiment of any of the foregoing electrified vehicles, the second plate is a thermal exchange plate.

In a further non-limiting embodiment of any of the foregoing electrified vehicles, the backplate includes an electrical interface configured to electrically couple to the auxiliary batteries.

In a further non-limiting embodiment of any of the foregoing electrified vehicles, the backplate includes a thermal management feature configured to thermally condition the auxiliary battery rack.

In a further non-limiting embodiment of any of the foregoing electrified vehicles, the thermal management feature includes a plurality of fans.

In a further non-limiting embodiment of any of the foregoing electrified vehicles, the storage compartment is one of a rear trunk and a front trunk of the electrified vehicle.

A method according to an exemplary aspect of the present disclosure includes, among other things, configuring a frame of an auxiliary battery rack from a support position to a collapsed position in which the frame occupies less volume in a storage compartment of an electrified vehicle than when in the support position.

In a further non-limiting embodiment of the foregoing method, the method includes inserting an auxiliary battery into a bay of the auxiliary battery rack to electrically couple the auxiliary battery to a battery pack of the electrified vehicle. Further, the bay is defined between columns, and the columns extend between first and second opposed plates. The first and second plates are connected to a backplate.

In a further non-limiting embodiment of any of the foregoing methods, the method includes adjusting a dimension of the bay by inserting the first plate into one of a plurality of sets of recesses in the backplate.

BRIEF DESCRIPTION OF THE DRAWINGS

In FIG. 2, the frame is in a support position, and there are two auxiliary batteries supported in the auxiliary battery rack.

DETAILED DESCRIPTION

This disclosure relates to an electrified vehicle with an auxiliary battery rack, which has a collapsible frame, and a corresponding method. In particular, the auxiliary battery rack is located at least partially within a storage compartment of the electrified vehicle. The auxiliary battery rack includes a frame configurable in a support position and a collapsed position in which the frame occupies less volume in the storage compartment than when in the support position. When in the support position, the auxiliary battery rack serves to extend the range of the electrified vehicle via the auxiliary batteries supported therein. When additional range is not needed or desired, the auxiliary batteries may be removed, and the frame may be collapsed. Thus, this disclosure strikes a balance between extending vehicle range without needlessly occupying storage space. These and other benefits will be appreciated from the following description.

Figure 1:
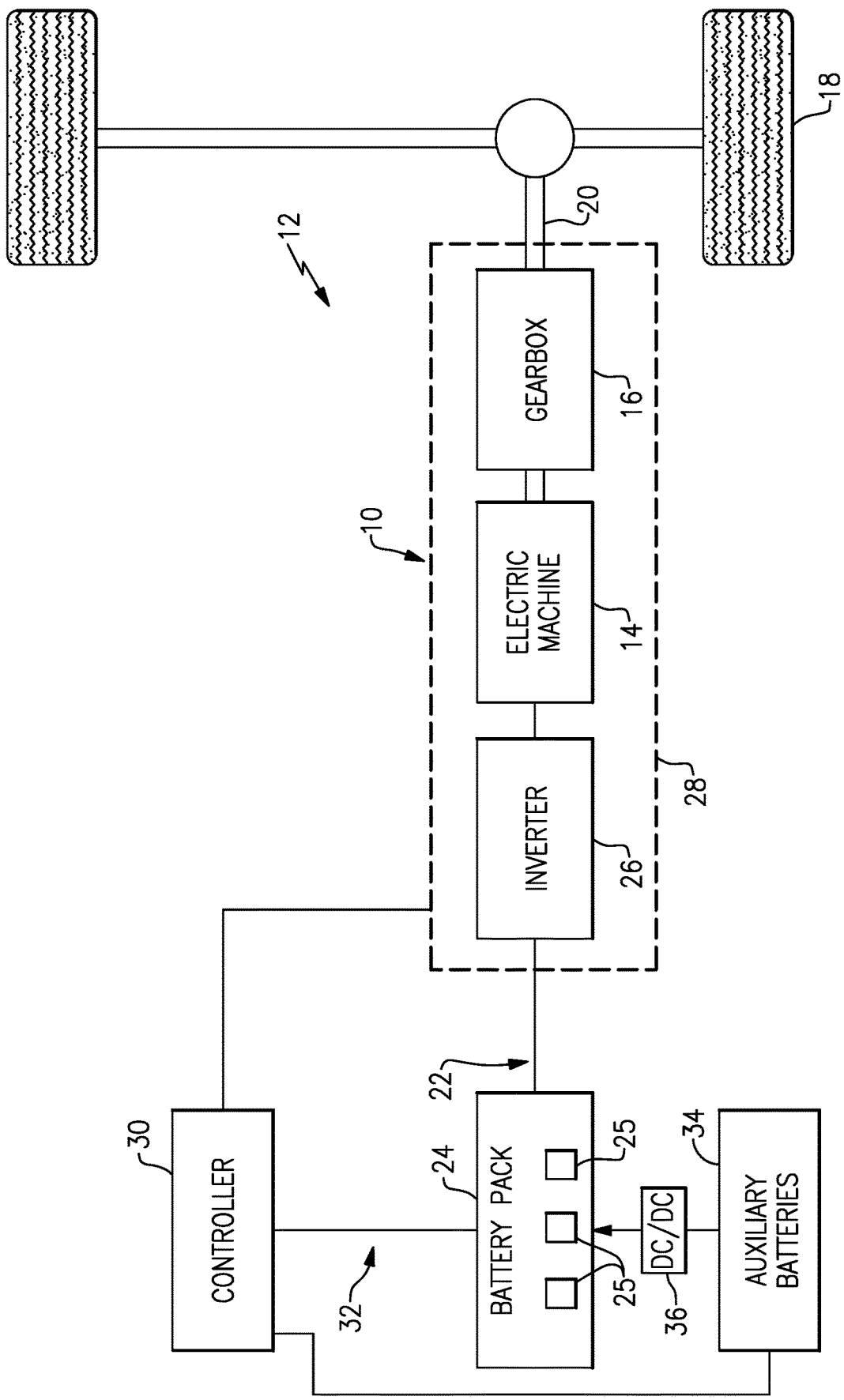
FIG. 1 schematically illustrates a powertrain of an electrified vehicle.

Referring now to the figures, FIG. 1 schematically illustrates a powertrain 10 of an electrified vehicle 12, which is shown as a battery electric vehicle (BEV). Initially, the powertrain 10 shown in FIG. 1 is highly schematic and is not intended to limit this disclosure. Various additional components could alternatively or additionally be employed by the powertrain 10 within the scope of this disclosure. Further, although the electrified vehicle 12 is depicted as a BEV, it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12. Further, this disclosure extends to any hybrid or electric vehicle including full hybrids, parallel hybrids, series hybrids, mild hybrids, and micro hybrids, among others.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 may be provided by a permanent magnet synchronous motor, although other motors may be used. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 (i.e., a "battery") through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., groupings of battery cells commonly known as arrays) capable of outputting electrical power to operate the electric machine 14 and/or other electrical loads of the electrified vehicle 12. Other types of energy storage devices and/or output devices can also be used to electrically power the electrified vehicle 12. The electrified vehicle 12 may also include a charging system for periodically charging energy storage devices (e.g., battery cells) of the battery pack 24. The charging system may be connected to an external power source, such as a grid power source, for receiving and distributing power to the energy storage devices.

The inverter 26 may be an electronic device including IGBTs (insulated-gate bipolar transistors) or other switches adapted to convert direct current (DC) from the battery pack 24 to alternating current (AC). In response to instructions from a controller 30, the inverter 26 may activate one or more of its switches to convert direct current from the battery pack 24 to alternating current for the electric machine 14. Based on a desired torque output, the controller 30 sends one or more instructions to the inverter 26, which in turn is operable to direct an appropriate voltage and frequency of AC current from the battery pack 24 to the electric machine 14.

In addition to communicating with the inverter 26, the controller 30 is configured to monitor and/or control various aspects of the powertrain 10 associated with the electrified vehicle 12. The controller 30, for example, may communicate with the electric machine 14, the battery pack 24, and the inverter 26. The controller 30 may also communicate with various other vehicle components and monitor other vehicle conditions. The controller 30 includes electronics, software, or both, to perform the necessary control functions for operating the electrified vehicle 12.

In one non-limiting embodiment, the controller 30 is a combination vehicle system controller and powertrain control module (VSC/PCM). Although it is shown as a single device, the controller 30 may include multiple controllers in the form of multiple hardware devices, or multiple software controllers with one or more hardware devices. A controller area network 32 (CAN) allows the controller 30 to communicate with the various components of the electrified vehicle 12.

In this example, the battery pack 24 is electrically coupled to at least one auxiliary battery 34. In a particular example, the battery pack 24 is electrically coupled to a plurality of auxiliary batteries 34. The auxiliary batteries 34 are relatively low voltage batteries compared to the battery assemblies 25, and in one example are less than or equal to about 60 Volts, whereas the battery assemblies 25 are typically on the order of 350 Volts.

The auxiliary batteries 34 are electrically coupled to the battery pack 24 via a DC-to-DC converter 36, in this example, which converts direct current from the auxiliary batteries 34 from one voltage level to another. In this example, the relatively low voltage provided by the auxiliary batteries 34 is converted to a relatively high corresponding to that of the battery pack 24. In one example, the auxiliary batteries 34 provide a voltage of less than or equal to about 60 Volts (DC) which is converted by the DC-to-DC converter 36 to about 350 Volts (DC). Alternatively, the DC-to-DC converter 36 may also convert relatively high voltage from the battery pack 24 to a relatively low voltage in order to charge the auxiliary batteries 34.

The auxiliary batteries 34 may be used to charge the battery pack 24, thereby extending the range of the electrified vehicle 12. The auxiliary batteries 34 may also be used to supply power to the inverter 26 directly (via the DC-to-DC converter 36, but bypassing the battery pack 24), which also has the effect of extending the range of the electrified vehicle 12. The auxiliary batteries 34 may be relatively small, light batteries, which are safely held and transported by individuals. The auxiliary batteries 34 may be charged in a user's home, garage, or office, as examples, and may be selectively inserted and removed from the electrified vehicle 12 as needed or desired. When inserted into the electrified vehicle 12, the auxiliary batteries 34 are held within an auxiliary battery rack in this disclosure. An example auxiliary battery rack will now be described.

Figure 2:
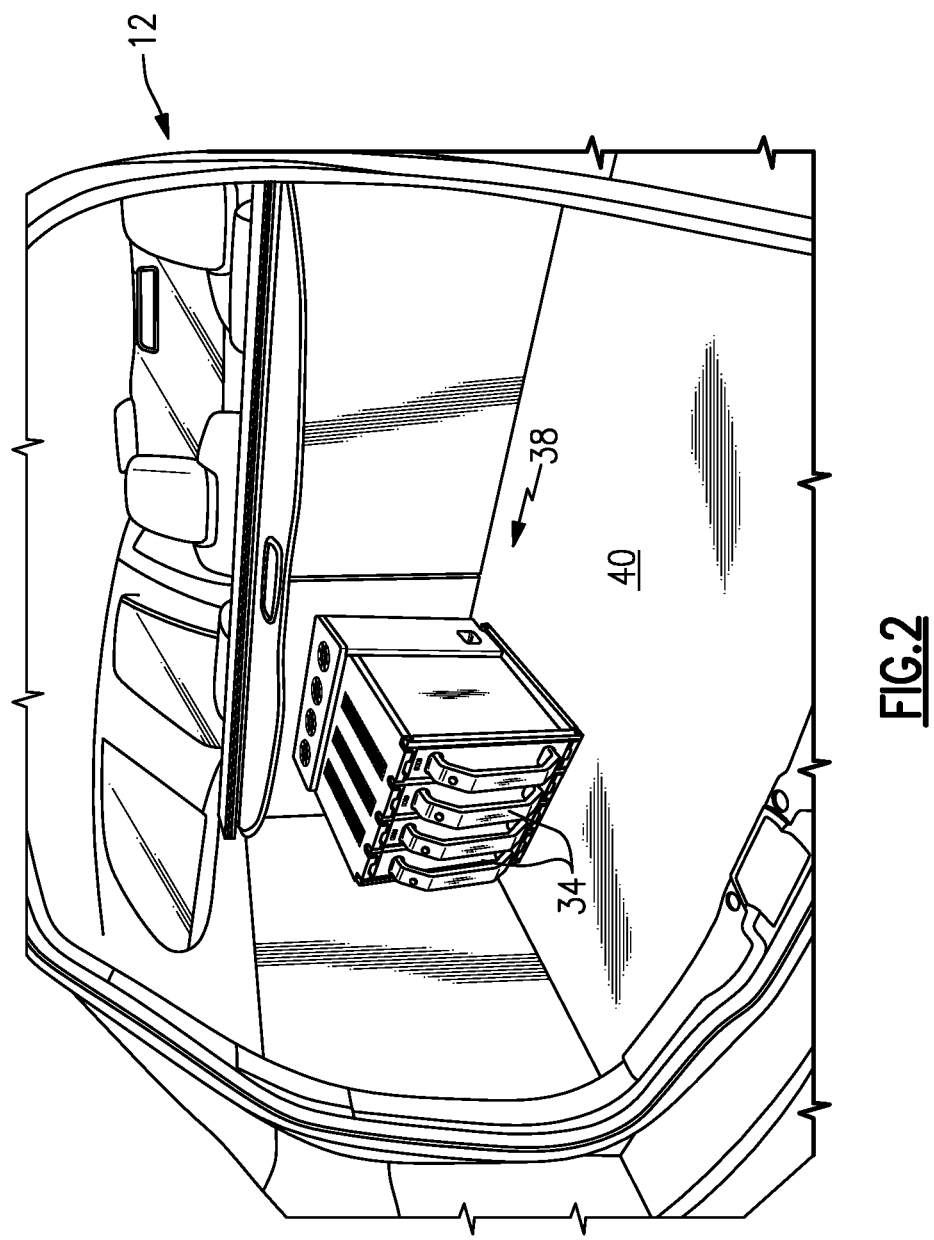
FIG. 2 is a perspective view of a storage compartment of the electrified vehicle including an auxiliary battery rack, which has a frame.

FIG. 2 illustrates an auxiliary battery rack 38 located within a storage compartment 40 of the electrified vehicle 12. In this example, the storage compartment 40 is a rear trunk of the electrified vehicle 12. The rear trunk is accessible by opening a rear trunk lid or a rear hatch. This disclosure is not limited to rear trunks, and extends to other storage compartments, such as front trunks ("frunks"), which are accessible via a front hood of a vehicle, and such as rear storage areas in sport utility vehicles (SUVs), which may be accessed via a rear lift gate. Again, this disclosure is not limited to any particular storage compartment.

Further, in FIG. 2, the auxiliary battery rack 38 is located entirely within the storage compartment 40. However, the auxiliary battery rack 38 could be at least partially enclosed within a structure adjacent the storage compartment 40, such as the side walls or the seat backs adjacent the storage compartment 40. In this way, the auxiliary battery rack 38 may take up less space within the storage compartment 40. While in FIG. 2 the auxiliary battery rack 38 abuts the seat backs, it should be understood that the auxiliary battery rack 38 may be essentially rotated 90-degrees relative to its FIG. 2 arrangement such that it abuts a side wall of the storage compartment 40. In this way, the auxiliary battery rack 38 does not interfere with any potential folding of the seats. It should also be understood that the auxiliary battery rack 38 could be arranged such that it abuts a bottom floor of the storage compartment 40. In this sense, this disclosure is not limited to any particular arrangement of the auxiliary battery rack 38 within the storage compartment 40.

Figure 3:
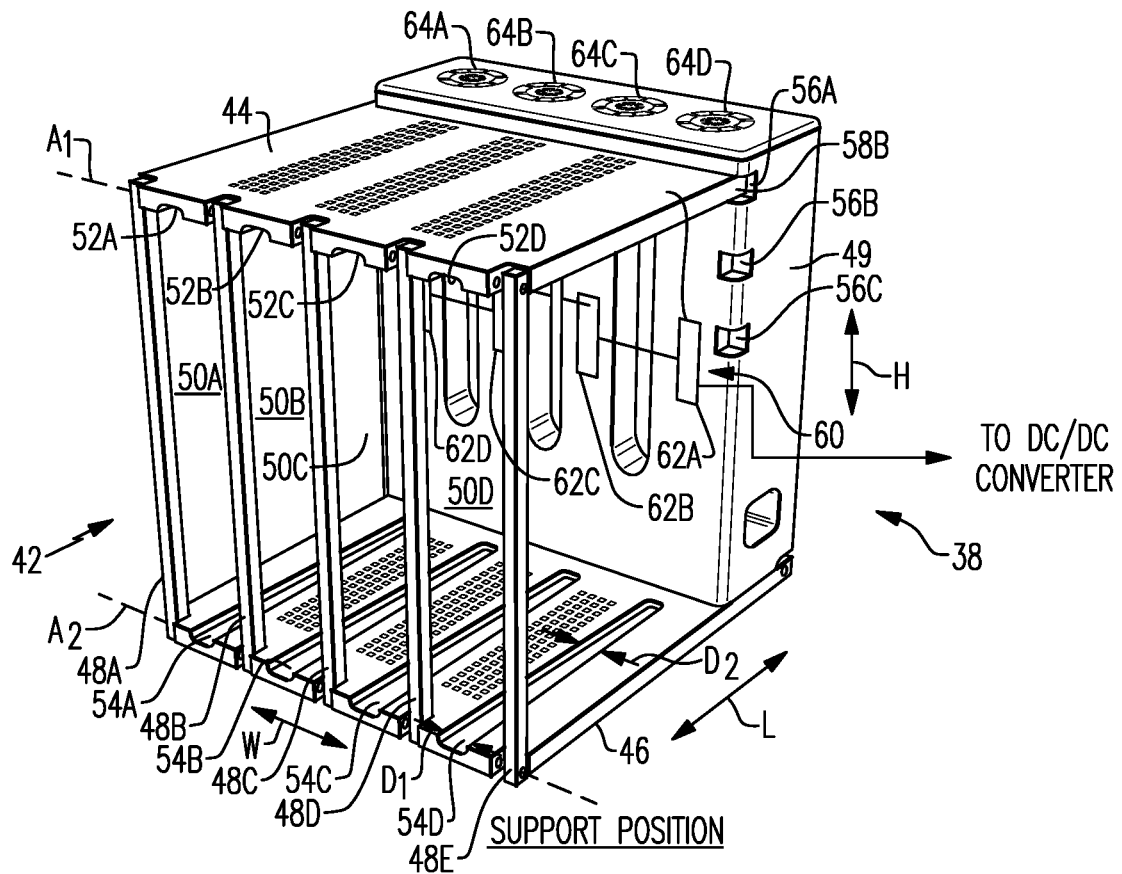
FIG. 3 illustrates the auxiliary battery rack with the frame in the support position.
Figure 4:
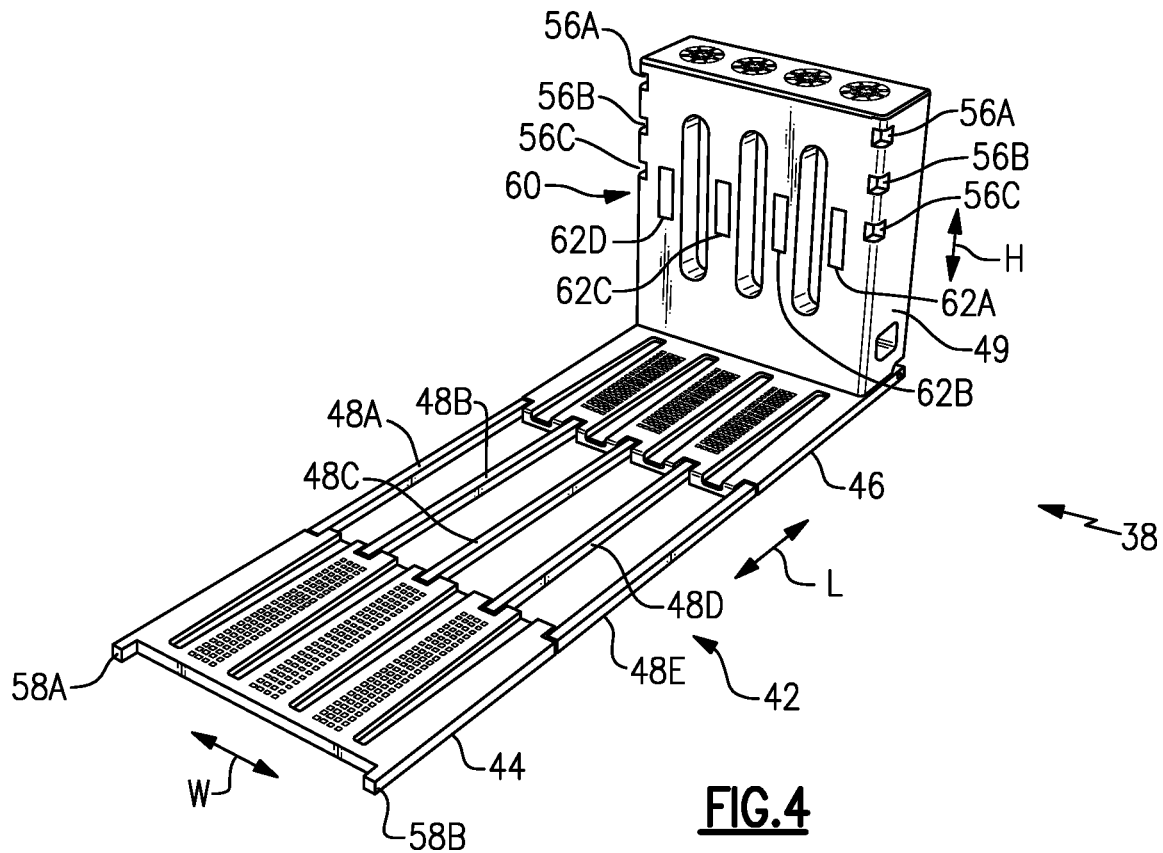
FIG. 4 illustrates the auxiliary battery rack with the frame in a collapsed position.

FIGS. 3 and 4 illustrate the auxiliary battery rack 38 in more detail, without showing the electrified vehicle 12 or auxiliary batteries 34. The auxiliary battery rack 38 includes a frame 42 configurable in a support position (FIG. 3) and a collapsed position (FIG. 4). In the support position, the auxiliary battery rack 38 is configured to support at least one auxiliary battery 34, as generally shown in FIG. 2. In the collapsed position, the frame 42 is arranged such that the auxiliary battery rack 38 occupies less volume than when the frame 42 is in the support position. Here, occupied volume refers to the three-dimensional space enclosed by an exterior surface of the components of the auxiliary battery rack 38.

With reference to FIG. 3, the frame 42 of the auxiliary battery rack 38 includes a first plate 44, a second plate 46, a plurality of columns 48A-48E, and a backplate 49. In the support position, the first plate 44 and second plate 46 are each connected to the backplate 49 and are arranged generally opposite one another relative to the backplate 49, meaning they are spaced-apart from one another relative to a height dimension H of the auxiliary battery rack 38. The columns 48A-48E are spaced-apart from one another relative to a width dimension W of the auxiliary battery rack 38. The columns 48A-48E extend between the first and second plates 44, 46, and are pivotally connected thereto. The columns 48A-48E are arranged relative to the first and second plates 44, 46 at a generally opposite end as the backplate 49, meaning the columns 48A-48E are spaced-apart from the backplate 49 relative to a length dimension L of the auxiliary battery rack 38.

When in the support position, the auxiliary battery rack 38 provides a plurality of bays 50A-50D, each configured to receive an auxiliary battery 34. Each of the plurality of bays 50A-50D is provided between adjacent ones of the plurality columns 48A-48E and between the first and second plates 44, 46. Specifically, a first bay 50A is provided with a first dimension between columns 48A and 48B and a second dimension between the first and second plates 44, 46. The first bay 50A also has a third dimension corresponding to the distance between the columns 48A-48E and the backplate 49. With reference to the volume occupied by the auxiliary battery rack 38 in the support position, it is about equal to the sum of the volume of the bays 50A-50D.

While in this disclosure there are five columns 48A-48E, this disclosure is not limited to auxiliary battery racks with five columns. Likewise, while four bays 50A-50D are shown, this disclosure is not limited to auxiliary battery racks with four bays. Further, while only one auxiliary battery rack 38 is shown in FIG. 2, the electrified vehicle could include additional auxiliary battery racks. The multiple auxiliary battery racks (if present) may be connected to one another in series, parallel, or in some combination of the two.

In order to electrically couple the auxiliary batteries 34 to the battery pack 24, auxiliary batteries 34 are slid into a respective one of the bays 50A-50D. Specifically, the auxiliary batteries 34 are slid into a respective one of the bays in a direction parallel to the length dimension L. In one aspect of this disclosure, at least one of the first plate 44 and the second plate 46 includes channels, each facing a respective bay, to assist with guiding the auxiliary batteries 34 into the bays. In the illustrated embodiment, the first plate 44 includes four channels 52A-52D, each of which faces a respective one of the bays 50A-50D. Likewise, the second plate 46 includes four channels 54A-54D, each of which faces a respective one of the bays 50A-50D. Specifically, the first plate 44 includes a first channel 52A facing the bay 50A, and the second plate 46 includes a second channel 54A facing the bay 50A, and so on. The channels 52A-52D, 54A-54D may engage a projection of the auxiliary batteries 34 and thereby assist with guiding the auxiliary batteries 34 into a respective bay.

Further to the channels, each of the channels 52A-52D, 54A-54D may be tapered to further facilitate insertion of the auxiliary batteries 34 and alignment with the corresponding electrical interfaces (discussed below). With reference to the channel 54D, the channel 54D includes a first width $D_1$ adjacent the opening to the bay 50D, which is adjacent the columns 48D, 48E. Moving toward the backplate 49, the width of the channel 54D gradually reduces and, as an example, exhibits a second width $D_2$ at a location spaced-apart from the location of the first width $D_1$. The location of the second width D2 is spaced-apart from the end of the channel 54D, and the width of the channel 54D may continue to reduce as it approaches the end. The channels 52A-52D, 54A-54C may exhibit a taper substantially similar to the one described relative to the channel 54D.

The height of the bays 50A-50D may be adjusted to correspond to auxiliary batteries 34 of different sizes. In particular, the dimension between the first and second plates 44, 46 may be adjusted. In the present disclosure, the relative arrangement of the first and second plates 44, 46 is adjusted by reconfiguring the first plate 44 relative to the backplate 49 and by selecting differently-sized columns 48A-48E. In particular, the backplate 49 includes a plurality of sets of recesses configured to hold the first plate 44. The backplate 49 in this example includes three sets of recesses 56A-56C (perhaps best seen in FIG. 4). Each set of recesses 56A-56C includes two recesses formed in a face of the backplate 49 facing the bays 50A-50D. The recesses 56A-56C may also be formed in side walls of the backplate 49. Each set of recesses 56A-56C is spaced-apart from one another relative to the height dimension H. The first plate 44 includes projections 58A, 58B which are sized to be received in any of the sets of recesses 56A-56C.

In FIG. 3, the projections 58A, 58B are received in the first set of recesses 56A. If one wanted to reduce the height of the bays 50A-50D, the projections 58A, 58B could be placed in either the second set of recesses 56B, or for an even further reduced height, the projections 58A, 58B could be placed in the third set of recesses 56C. The user may also have multiple sets of columns 48A-48E which correspond to the different recesses 56A-56C. For instance, shorter columns 48A-48E would be required if projections 58A, 58B were in the second set of recesses 56B than those shown in FIG. 3. To this end, the columns 48A-48E may be snap-fit relative to the first and second plates 44, 46. Alternatively, the columns 48A-48E could be height-adjustable, such as by being telescopic.

In order to accommodate auxiliary batteries of different lengths, the first and second plates 44, 46 could be replaced by differently-sized plates. Further, in order to accommodate auxiliary batteries of different widths, one or more of the columns 48A-48E could be removed. To this end, the first and second plates 44 may be snap-fit relative to the columns 48A-48E and the backplate 49, or alternatively may be held in place by pins or other types of attachments. In this way, the auxiliary battery rack 38 readily accommodates auxiliary batteries of various shapes and sizes.

The auxiliary battery rack 38 may include a number of other features. In particular, the backplate 49 may include an electrical interface 60 configured to electrically couple the auxiliary batteries 34 to the battery pack 24 (via the DC-to-DC converter 36 in this example). In this example, the electrical interface 60 includes a plurality of ports 62A-62D, each configured to couple to a corresponding port in a respective one of the auxiliary batteries 34. The auxiliary battery rack 38 includes four ports 62A-62D in this example, such that each port 62A-62D may electrically couple to an auxiliary battery 34 within each of the bays 50A-50D. The electrical interface 60 may couple the auxiliary batteries 34 together in parallel, series, or some combination of the two, relative to the battery pack 24. The electrical interface 60 may also balance the state of charge (SOC) between the auxiliary batteries 34.

The auxiliary battery rack 38 may also include one or more thermal management features. In one example, the first plate 44, the second plate 46, and/or the backplate 49 may include a thermal exchange plate, which includes an inlet port, an outlet port, and at least one interior channel configured to circulate a working fluid therein. The working fluid is configured to absorb heat from the auxiliary batteries 34. In another example, the backplate 49 includes a plurality of fans 64A-64D configured to circulate air within the backplate 49 to absorb heat from the auxiliary batteries 34.

Figure 5:
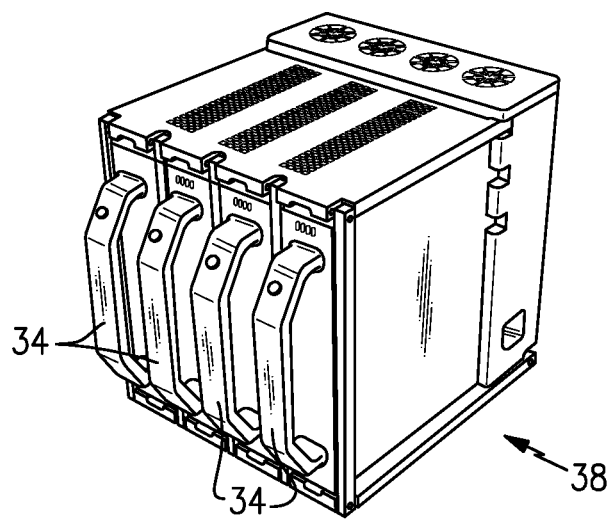
FIG. 5 illustrates the auxiliary battery rack in the support position and with four auxiliary batteries supported therein.

When in the support position, the auxiliary battery rack 38 may receive anywhere from one up to four auxiliary batteries 34. As examples, FIG. 2 shows two auxiliary batteries 34 in the auxiliary battery rack 38, and FIG. 5 shows four auxiliary batteries 34 in the auxiliary battery rack 38. As generally mentioned above, a user may charge the relatively low voltage auxiliary batteries 34 at home, for example, by plugging them into a rack or mount similar to the auxiliary battery rack 38. If the user believes that the normal range of his or her electrified vehicle 12 may need to be extended for a particular trip, then the user may insert an appropriate number of auxiliary batteries 34 into the auxiliary battery rack 38. While useful in extending range, the auxiliary battery rack 38 does occupy volume in the storage compartment 40. Thus, when not in use, the user may collapse the frame 42 to reduce the volume the auxiliary battery rack 38 occupies in the storage compartment.

With reference to FIG. 3, the first plate 44 is pivotably connected to the columns 48A-48E about a first axis $A_1$. The first axis $A_1$ extends in a direction parallel to the width dimension W. Further, the second plate 46 is pivotably connected to the columns 48A-48E about a second axis $A_2$, which is parallel to the first axis $A_1$. The first and second plates 44, 46 and columns 48A-48E may pivot about pins that project therethrough along the axes $A_1$, $A_2$. This disclosure is not limited to any particular pivoting connection, however.

Figure 6:
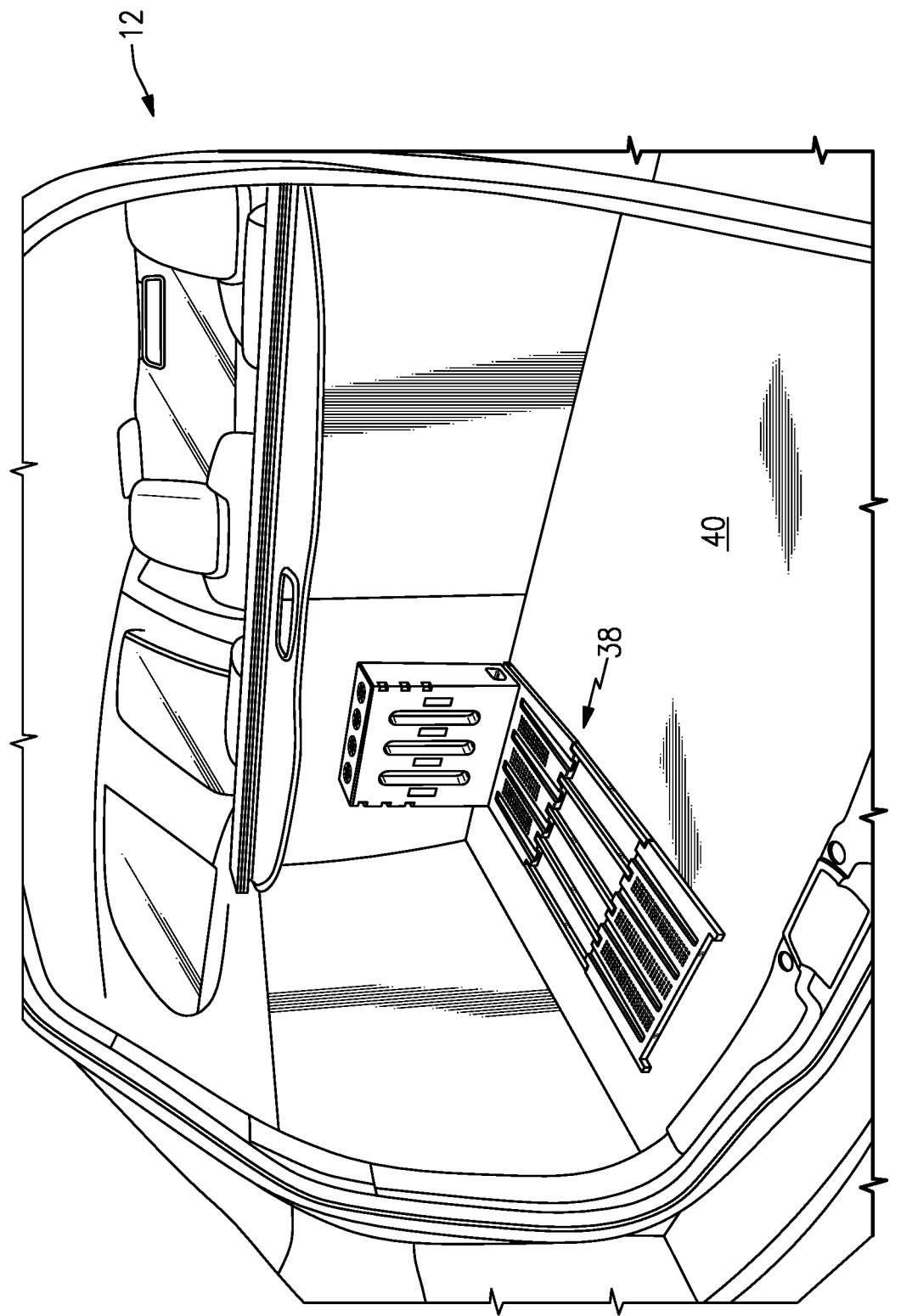
FIG. 6 is a perspective view of the storage compartment with frame of the auxiliary battery rack in the collapsed position.

In order to collapse the auxiliary battery rack 38, the first plate 44 is removed from the first set of recesses 56A and pivoted away from the backplate 49 about the axis $A_1$. This movement causes the columns 48A-48E to pivot relative to the second plate 46 about the axis $A_2$. Continuing such movement, the first plate 44 and the columns 48A-48E will lie in a common plane with the second plate 46, as shown in FIG. 4. The common plane, in this example, is normal to the height H of the backplate 49. When in the collapsed position, the frame 42 occupies less volume in the storage compartment 40 of the electrified vehicle 12 than when the auxiliary battery rack is in the support position. As shown in FIG. 6, the auxiliary battery rack 38 is arranged such that a user may place items such as groceries on the collapsed auxiliary battery rack 38, and specifically on the first plate 44, the columns 48A-48E, and the second plate 46, whereas in the support position the frame 42 would have occupied that space.

Figure 7:
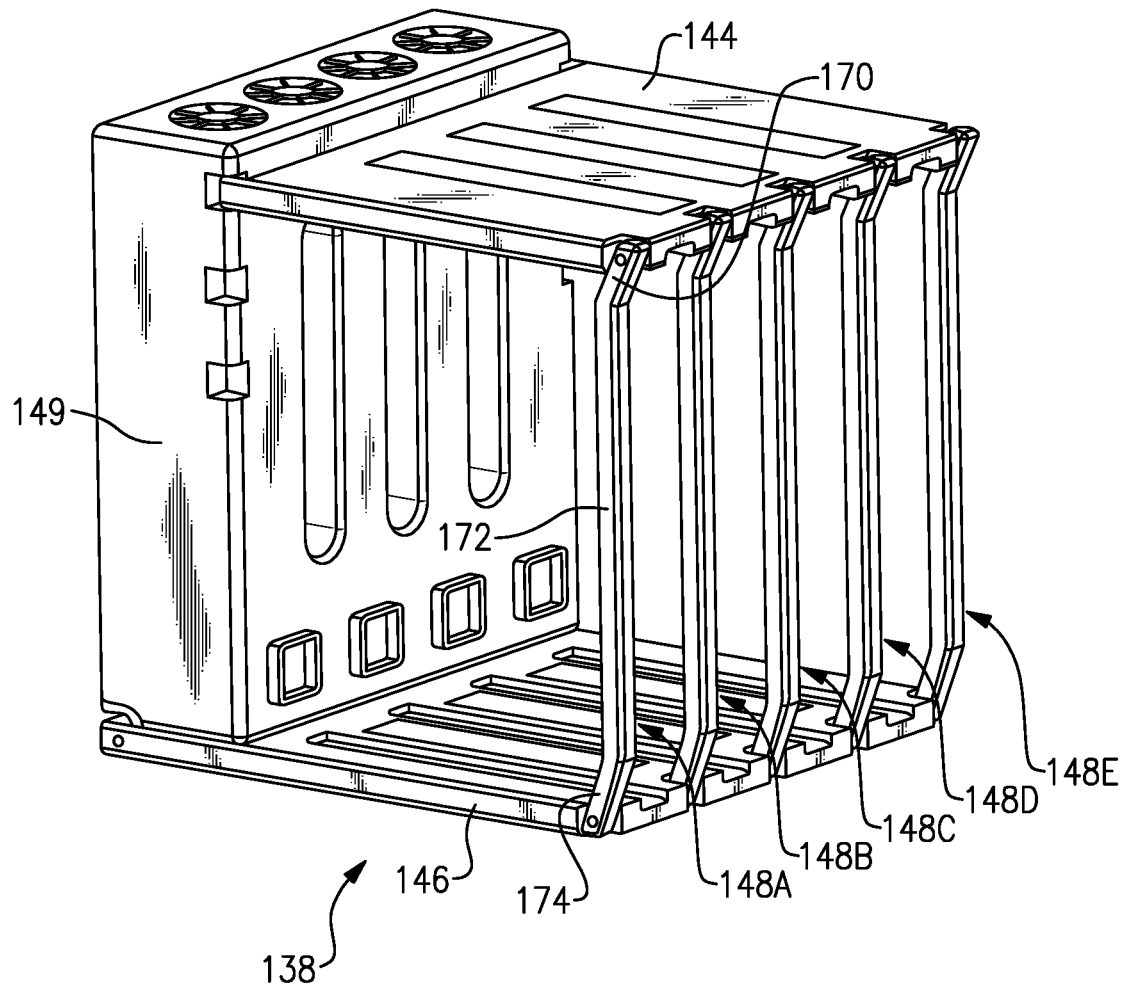
FIG. 7 illustrates a second example auxiliary battery rack with a frame in the support position.

FIG. 7 illustrates a second example auxiliary battery rack 138 according to the present disclosure with a frame in the support position. To the extent not otherwise described or shown, the auxiliary battery rack 138 corresponds to the auxiliary battery rack 38 of FIGS. 2-6, with like parts having reference numerals preappended with a "1."

The auxiliary battery rack 138 differs primarily from the auxiliary battery rack 38 in that it includes columns 148A-148E with angled end sections which allow the auxiliary battery rack 138 to collapse differently. In particular, with reference to the column 148A, the column 148A includes a first angled section 170 adjacent the first plate 144. The first angled section 170 projects downward toward the second plate 146 and is also inclined toward the back plate 149, relative to FIG. 7. The first angled section 170 transitions into a straight section 172, which is substantially straight and projects toward the second plate 146 in FIG. 7. The majority of the length of the column 148A is the straight section 172. Adjacent the second plate 146, the straight section 172 transitions into a second angled section 174, which projects downward from the straight section 172 and is inclined toward the backplate 149, relative to FIG. 7. It should be understood that the columns 148B-148E would be arranged similarly.

Figure 8A:
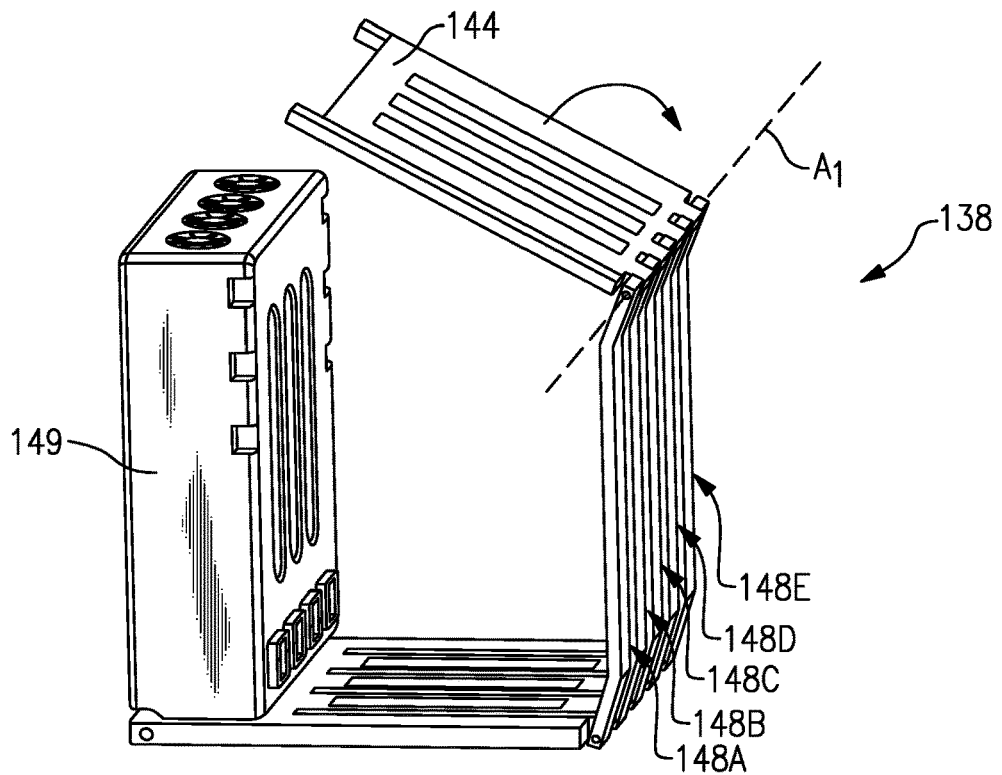
FIG. 8A illustrates the second auxiliary battery rack of FIG. 7 with a first plate rotating about a first axis.
Figure 8B:
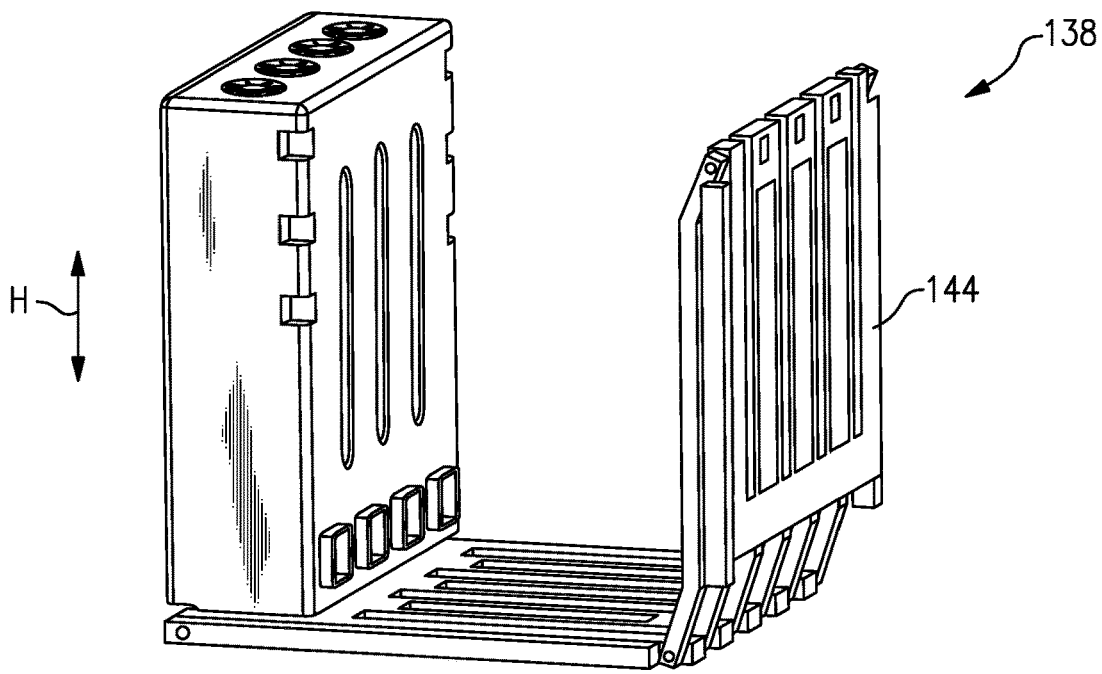
FIG. 8B illustrates the second auxiliary battery rack with the first plate having been rotated about 270-degrees about the first axis relative to its arrangement in FIG. 7.
Figure 8C:
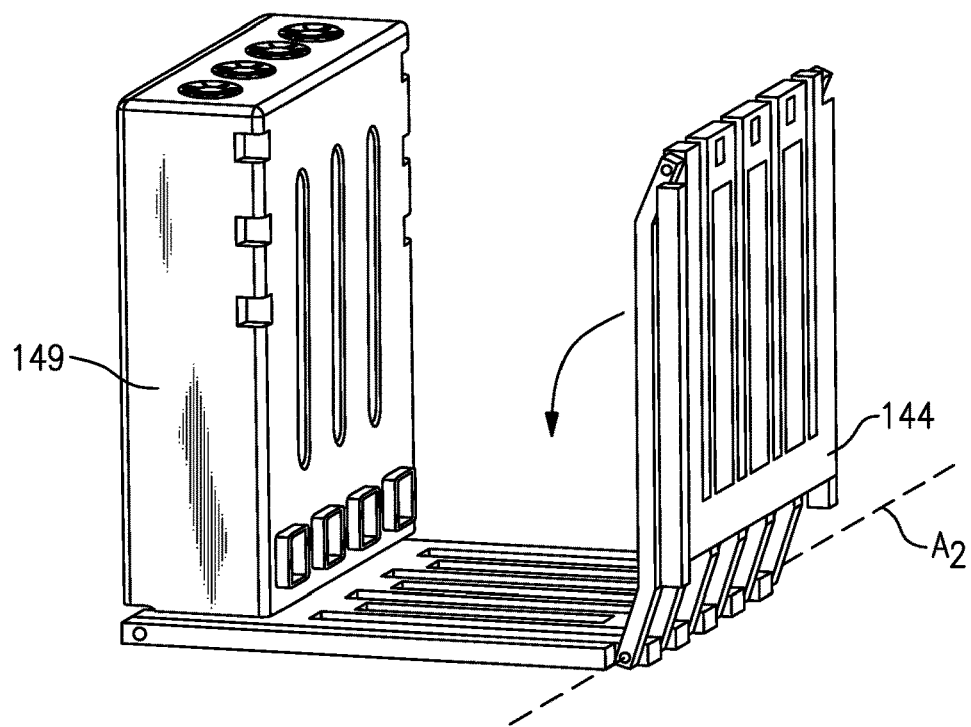
FIG. 8C illustrates the second auxiliary battery rack with the first plate and columns rotating about a second axis.
Figure 8D:
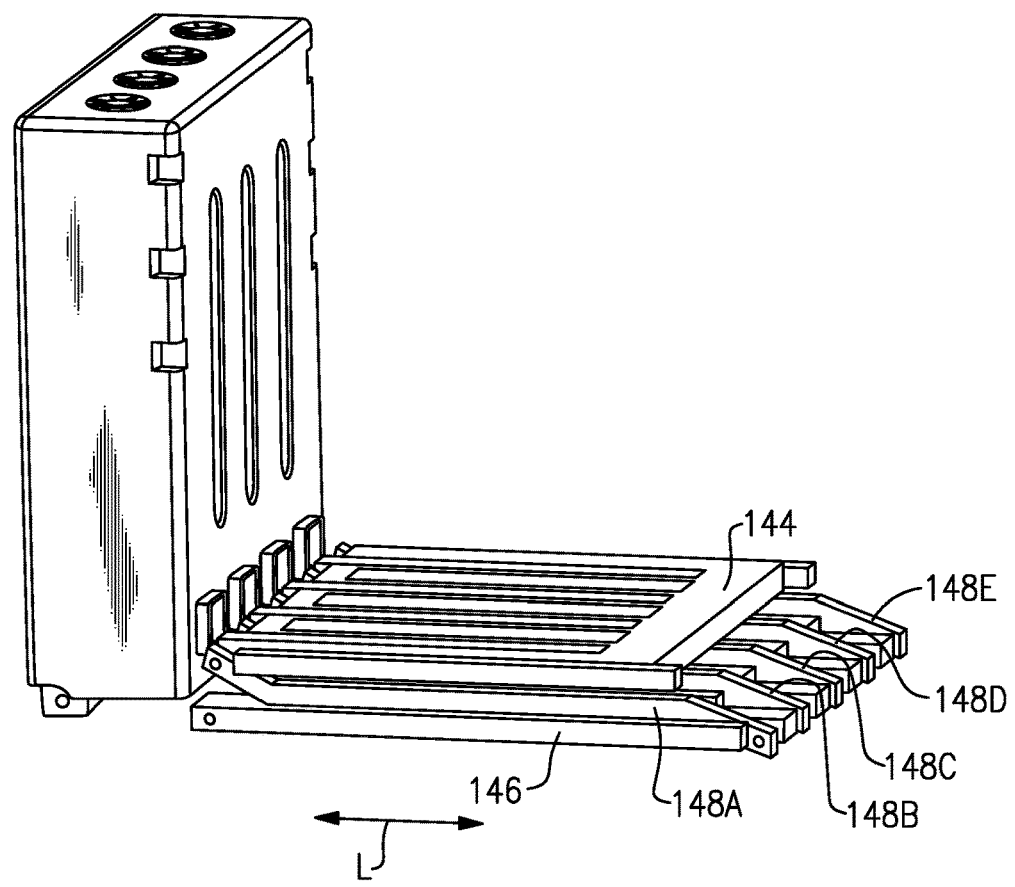
FIG. 8D illustrates the second auxiliary battery rack with the first plate and columns on a second plate.
Figure 8E:
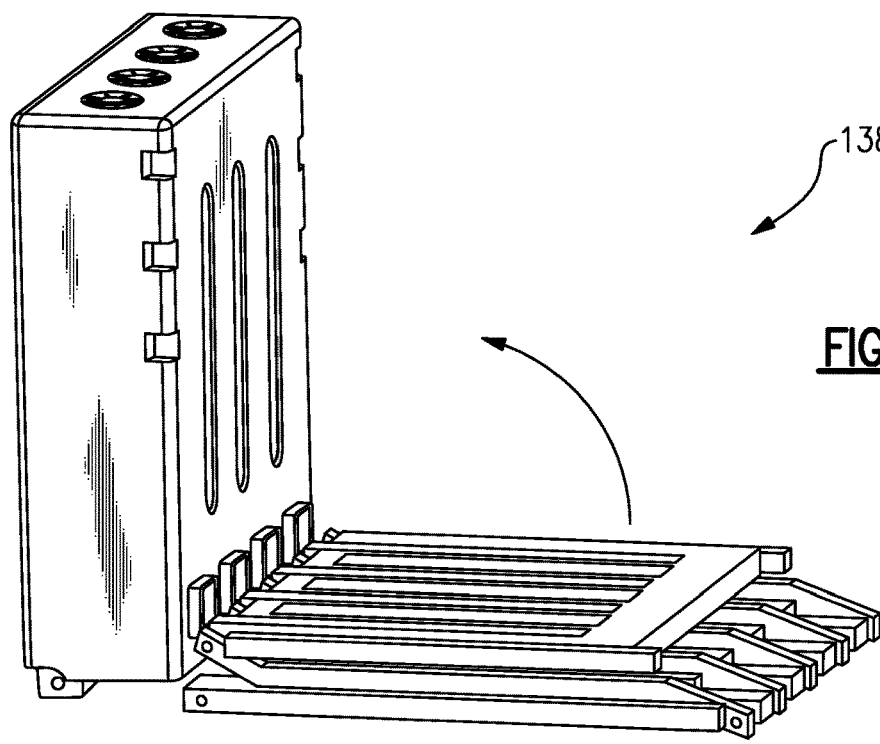
FIG. 8E illustrates further rotation of the first plate, columns, and second plate.
Figure 8F:
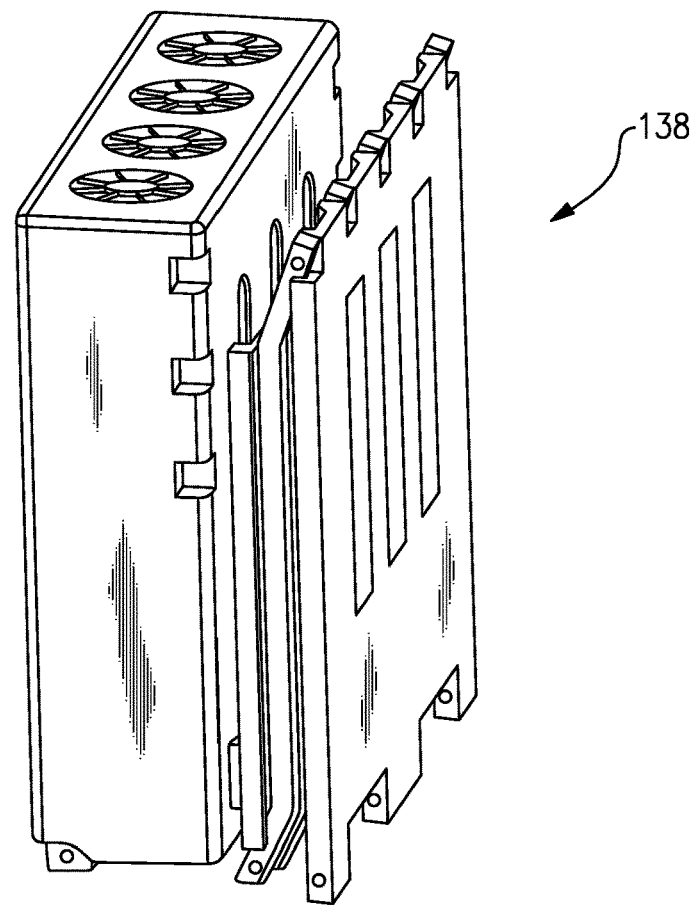
FIG. 8F illustrates the first plate, columns, and second plate on a backplate of the second auxiliary battery rack.

The first and second angled sections 170, 174 allow the frame of the auxiliary battery rack 138 to collapse as shown and described relative to FIGS. 8A-8F. In FIG. 8A, the first plate 144 is rotated away from the backplate 149 about axis A₁ through a range of about 270-degrees to the position of FIG. 8B, wherein the first plate 144 projects in the height direction H, in the same way as the columns 148A-148E. Next, as shown in FIG. 8C, the first plate 144 and columns 148A-148F are rotated together about the axis A₂ toward the backplate 149 about 90-degrees until they rest upon the second plate 146. As shown in FIG. 8D second plate 146 is moved in a direction parallel to the length L to permit the first plate 144 and columns 148A-148E to rest thereon, in this example. In FIG. 8D, the first plate 144, second plate 146, and columns 148A-148E are stacked on one another. The entire stacked assembly (i.e., the first plate 144, second plate 146, and columns 148A-148E) may be rotated again by about 90-degrees toward the backplate 149, as shown in FIG. 8E, and rest thereon, as shown in FIG. 8F. Alternatively, the stacked assembly may be stored elsewhere in the storage compartment 40. The alternate collapsed position and technique shown in FIGS. 8A-8F may be more desirable than that of FIGS. 4 and 6 in certain applications.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
    an auxiliary battery rack located at least partially within a storage compartment of the electrified vehicle, the auxiliary battery rack including a frame configurable in a support position and a collapsed position in which the frame occupies less volume in the storage compartment than when in the support position; and
    a battery pack configured to supply electrical power to an electrical machine, wherein at least one auxiliary battery is electrically coupled to the battery pack via the auxiliary battery rack.

2. The electrified vehicle as recited in claim 1, wherein, when the frame is in the support position, the auxiliary battery rack is configured to support at least one auxiliary battery.

3. The electrified vehicle as recited in claim 1, further comprising a DC-to-DC converter configured to increase the voltage provided by the at least one auxiliary battery and supply the increased voltage to the battery pack.

4. The electrified vehicle as recited in claim 1, wherein the storage compartment is one of a rear trunk and a front trunk of the electrified vehicle.

5. An electrified vehicle, comprising:
    an auxiliary battery rack located at least partially within a storage compartment of the electrified vehicle, the auxiliary battery rack including a frame configurable in a support position and a collapsed position in which the frame occupies less volume in the storage compartment than when in the support position; and
    wherein, when the frame is in the support position, the frame provides a plurality of bays, each configured to receive an auxiliary battery.

6. The electrified vehicle as recited in claim 5, wherein:
    the frame includes a first plate, a second plate arranged generally opposite the first plate, a plurality of columns extending between the first and second plates, and a backplate connected to the first and second plates and arranged generally opposite the plurality of columns, and
    each of the plurality of bays is provided between adjacent ones of the plurality columns and between the first and second plates.

7. The electrified vehicle as recited in claim 6, wherein:
    at least one of the first plate and the second plate includes a plurality of channels,
    each of the channels faces a respective one of the plurality of bays, and
    each of the channels are configured to guide an auxiliary battery.

8. The electrified vehicle as recited in claim 7, wherein a width dimension of the channels tapers moving toward the backplate.

9. The electrified vehicle as recited in claim 6, wherein:
    the backplate includes a plurality of sets of recesses configured to hold the first plate, each set of recesses spaced-apart from one another, and
    the first plate is received one of the sets of recesses to establish a distance between the first and second plates and a dimension of each of the bays.

10. The electrified vehicle as recited in claim 9, wherein the plurality of columns have a dimension corresponding to the distance between the first and second plates.

11. The electrified vehicle as recited in claim 6, wherein, when the frame is in the collapsed position, the plurality of columns and the first plate lie in a common plane with the second plate.

12. The electrified vehicle as recited in claim 6, wherein, when the frame is in the collapsed position, the first plate, the plurality of columns, and the second plate are stacked upon one another.

13. The electrified vehicle as recited in claim 6, wherein the second plate is a thermal exchange plate.

14. The electrified vehicle as recited in claim 6, wherein the backplate includes an electrical interface configured to electrically couple to the auxiliary batteries.

15. The electrified vehicle as recited in claim 6, wherein the backplate includes a thermal management feature configured to thermally condition the auxiliary battery rack.

16. The electrified vehicle as recited in claim 15, wherein the thermal management feature includes a plurality of fans.

17. A method, comprising:
    configuring a frame of an auxiliary battery rack from a support position to a collapsed position in which the frame occupies less volume in a storage compartment of an electrified vehicle than when in the support position; and
    inserting an auxiliary battery into a bay of the auxiliary battery rack to electrically couple the auxiliary battery to a battery pack of the electrified vehicle, wherein the bay is defined between columns, wherein the columns extend between first and second opposed plates, and wherein the first and second plates are connected to a backplate.

18. The method as recited in claim 17, further comprising:
    adjusting a dimension of the bay by inserting the first plate into one of a plurality of sets of recesses in the backplate.

* * * * *